United States Patent
Ur et al.

(10) Patent No.: US 9,817,626 B2
(45) Date of Patent: Nov. 14, 2017

(54) COMPOSITE DISPLAY WITH MULTIPLE IMAGING PROPERTIES

(71) Applicant: EMPIRE TECHNOLOGY DEVELOPMENT LLC, Wilmington, DE (US)

(72) Inventors: Shmuel Ur, Galil (IL); Vlad Grigore Dabija, Mountain View, CA (US); David Ash, Bellevue, WA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 238 days.

(21) Appl. No.: 14/352,266

(22) PCT Filed: Jul. 25, 2013

(86) PCT No.: PCT/US2013/052010
§ 371 (c)(1),
(2) Date: Apr. 16, 2014

(87) PCT Pub. No.: WO2015/012835
PCT Pub. Date: Jan. 29, 2015

(65) Prior Publication Data
US 2015/0029217 A1    Jan. 29, 2015

(51) Int. Cl.
*G09G 5/377* (2006.01)
*G02B 27/01* (2006.01)
(Continued)

(52) U.S. Cl.
CPC ............. *G06F 3/1423* (2013.01); *G09G 5/14* (2013.01); *G02B 2027/0178* (2013.01);
(Continued)

(58) Field of Classification Search
CPC ........... H04N 1/00469; H04N 1/40068; H04N 9/3188; G06T 3/40; G06T 2207/20212;
(Continued)

(56) References Cited

U.S. PATENT DOCUMENTS

| | | |
|---|---|---|
| 5,345,555 A | 9/1994 | Providenza et al. |
| 5,956,046 A | 9/1999 | Kehlet et al. |

(Continued)

FOREIGN PATENT DOCUMENTS

EP          0575146 A2     12/1993

OTHER PUBLICATIONS

Jurgelionis, A., et al., "Distributed video game streaming system for pervasive gaming," STreaming Day, Sep. 2009, pp. 6.
(Continued)

*Primary Examiner* — Chante Harrison
(74) *Attorney, Agent, or Firm* — Moritt Hock & Hamroff LLP; Steven S. Rubin, Esq.

(57) ABSTRACT

Technologies are generally described for systems and methods effective to output a composite image. In some examples, a processor may be configured to receive first and second display data that relate to a first and second image. The processor may identify an overlap region where the first display overlaps the second display and generate imaging instructions effective to cause the first and second image to be output on the first display and second display, respectively. The processor may further modify the first imaging instructions based on the overlap region to produce a modified first imaging instruction. The processor may send the modified first imaging instruction to the first display so that the first image is output on the first display at a first resolution. The processor may send the second imaging instruction to the second display so that the second image is output on the second display at a second resolution.

18 Claims, 6 Drawing Sheets

(51) Int. Cl.
*G09G 5/00* (2006.01)
*G06F 3/14* (2006.01)
*G09G 5/14* (2006.01)

(52) U.S. Cl.
CPC .... *G06T 2207/20212* (2013.01); *G09G 5/005* (2013.01); *G09G 5/377* (2013.01); *G09G 2340/04* (2013.01); *G09G 2340/045* (2013.01); *G09G 2340/0407* (2013.01); *G09G 2356/00* (2013.01)

(58) Field of Classification Search
CPC ............ G06T 11/60; G09G 2340/0407; G09G 2340/04; G09G 5/377; G09G 5/227; G09G 5/391; G09G 5/14; G09G 5/005; G09G 2340/045; G09G 2356/00; G02B 2027/0178; G02B 7/017; G02B 7/0179; G06F 3/1423
USPC ........ 345/7, 8, 629, 660, 667, 671, 619, 418
See application file for complete search history.

(56) References Cited

U.S. PATENT DOCUMENTS

| | | | |
|---|---|---|---|
| 6,890,077 B2 | 5/2005 | Dunn | |
| 7,705,864 B2 | 4/2010 | Ahmed et al. | |
| 8,941,559 B2* | 1/2015 | Bar-Zeev | G02B 26/026 345/7 |
| 8,957,862 B2* | 2/2015 | Sugimoto | G06F 3/02 345/8 |
| 9,433,860 B2* | 9/2016 | Shikata | A63F 13/843 |
| 2008/0068291 A1 | 3/2008 | Yuan et al. | |
| 2010/0271288 A1* | 10/2010 | Srinivasan | G06F 3/1454 345/2.2 |
| 2010/0321382 A1* | 12/2010 | Amaratunga | H04N 5/74 345/419 |
| 2011/0128294 A1 | 6/2011 | Manabe et al. | |
| 2011/0285704 A1* | 11/2011 | Takeda | A63F 13/10 345/419 |
| 2012/0062711 A1 | 3/2012 | Ikeda et al. | |
| 2012/0120296 A1* | 5/2012 | Roberts | H04N 21/4126 348/333.12 |
| 2013/0201209 A1* | 8/2013 | Findlay | G06F 3/1454 345/629 |
| 2015/0070357 A1* | 3/2015 | Tahan | G09G 5/00 345/428 |
| 2015/0206350 A1* | 7/2015 | Gardes | G06T 7/70 345/619 |
| 2016/0014350 A1* | 1/2016 | Osman | H04N 5/2621 348/239 |

OTHER PUBLICATIONS

Newman, J., "Google 'Project Glass' Teases Augmented reality Glasses," PC World, accessed at http://web.archive.org/web/20130515213541/http://www.pcworld.com/article/253200/googles_project_glass_teases_augmented_reality_glasses.html, Apr. 4, 2012, pp. 1-3.

IllumiRoom: Peripheral Projected Illusions for Interactive Experiences, Microsoft Research, accessed at research.microsoft.com/en-us/projects/illumiroom/, on May 8, 2013, 2 pages.

Lee, K., IllumiRoom could turn your living room into a holodeck (without Picard, anyway), Game On (/Column/ Game-ON/), Apr. 29, 2013, 3 pages.

International Search Report with Written Opinion for International Application No. PCT/US2013/052010 dated Feb. 6, 2014, 10 pages.

* cited by examiner

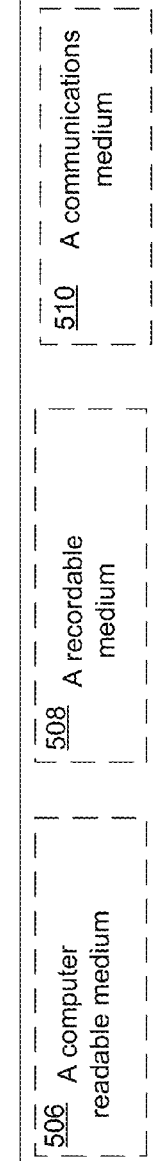

Fig. 5

500 A computer program product.

502 A signal bearing medium.

504
At least one of
 one or more instructions for a method for outputting a composite image that includes a first image and a second image; or
 one or more instructions for receiving first display data that relates to the first image to be output on a first display, where the first display includes a first imaging property and a first resolution; or
 one or more instructions for receiving second display data that relates to the second image to be output on a second display, where the second display includes a second imaging property and a second resolution, the second imaging property being different from the first imaging property; or
 one or more instructions for identifying an overlap region where the first display overlaps the second display; or
 one or more instructions for generating a first imaging instruction effective to cause the first image to be output on the first display based on the first display data; or
 one or more instructions for generating a second imaging instruction effective to cause the second image to be output on the second display based on the second display data; or
 one or more instructions for modifying the first imaging instruction based on the overlap region to produce a modified first imaging instruction; or
 one or more instructions for sending the modified first imaging instruction to the first display so that the first image is output on the first display at the first resolution at a first time; or
 one or more instructions for sending the second imaging instruction to the second display so that the second image is output on the second display at the second resolution at a second time, where the first time is substantially equal to the second time.

506 A computer readable medium

508 A recordable medium

510 A communications medium

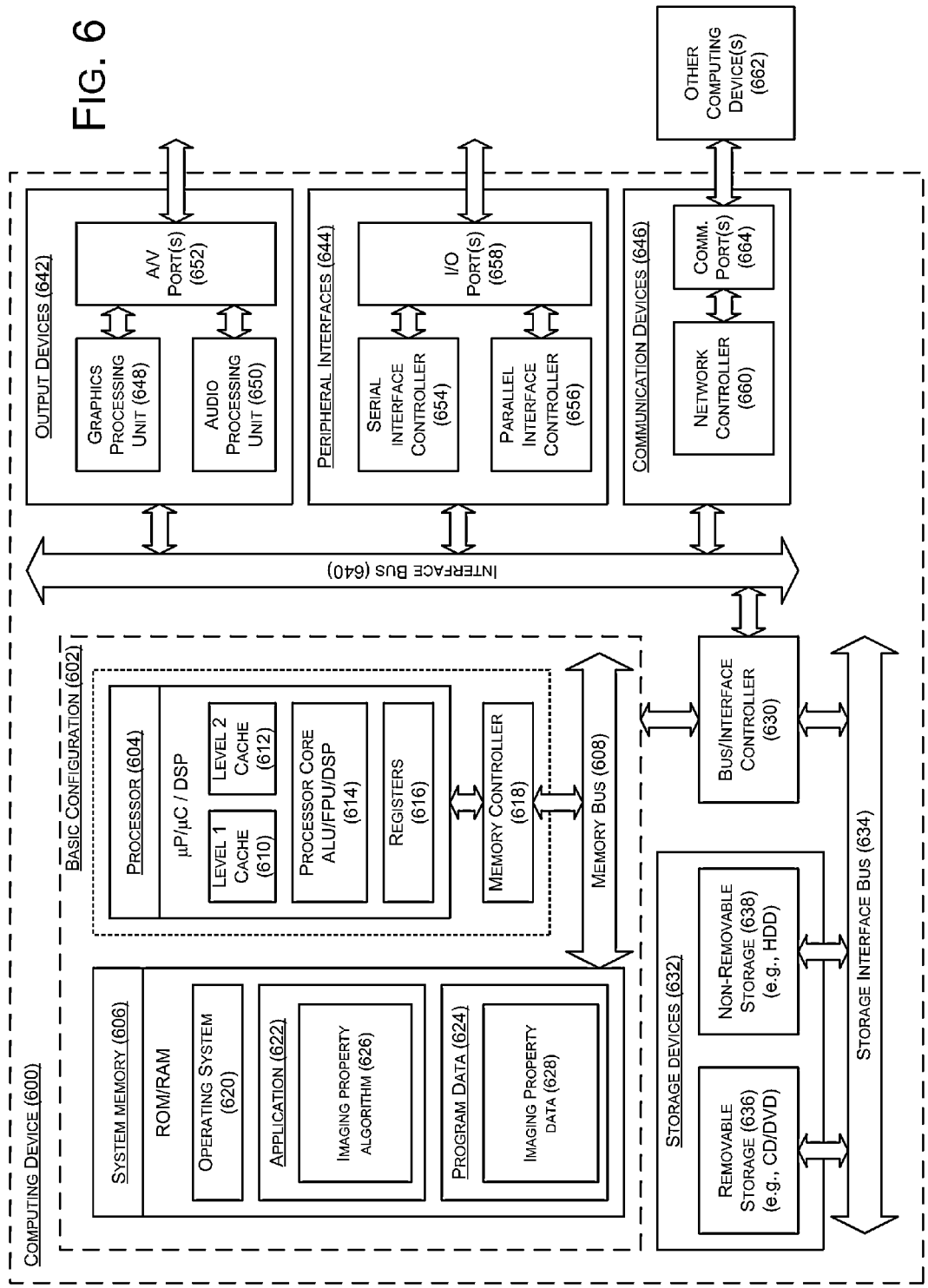

COMPOSITE DISPLAY WITH MULTIPLE IMAGING PROPERTIES

CROSS REFERENCE TO RELATED APPLICATION

This application is a U.S. National Stage filing under 35 U.S.C §371 of International Application No. PCT/US13/52010, filed on Jul. 25, 2013, the entirety of which is hereby incorporated by reference.

BACKGROUND

Unless otherwise indicated herein, the materials described in this section are not prior art to the claims in this application and are not admitted to be prior art by inclusion in this section.

Displays may be used for generating images for viewing in many environments such as for computing, gaming, business and entertainment. Many types of devices may be used as a display. Displays can vary in style, size, and resolution.

SUMMARY

According to some examples, methods for outputting a composite image that includes a first image and a second image are generally described. The methods may include receiving first display data that relates to the first image to be output on a first display. The first display may include a first imaging property and a first resolution. The methods may include receiving second display data that relates to the second image to be output on a second display. The second display may include a second imaging property and a second resolution. The second imaging property may be different from the first imaging property. The methods may include identifying an overlap region where the first display overlaps the second display. The methods may include generating a first imaging instruction effective to cause the first image to be output on the first display based on the first display data. The methods may include generating a second imaging instruction effective to cause the second image to be output on the second display based on the second display data. The methods may include modifying the first imaging instruction based on the overlap region to produce a modified first imaging instruction. The methods may include sending the modified first imaging instruction to the first display so that the first image is output on the first display at the first resolution at a first time. The methods may include sending the second imaging instruction to the second display so that the second image is output on the second display at the second resolution at a second time. The first time may be substantially equal to the second time.

According to other examples, devices effective to output a composite image that includes a first image and a second image are generally described. The devices may include a memory and a processor. The memory may include instructions. The processor may be configured to be in communication with the memory. The processor may be configured to receive first display data that relates to the first image to be output on a first display. The first display may include a first imaging property and a first resolution. The processor may be configured to receive second display data that relates to the second image to be output on a second display. The second display may include a second imaging property and a second resolution. The second imaging property may be different from the first imaging property. The processor may be configured to identify an overlap region where the first display overlaps the second display. The processor may be configured to generate a first imaging instruction effective to cause the first image to be output on the first display based on the first display data. The processor may be configured to generate a second imaging instruction effective to cause the second image to be output on the second display based on the second display data. The processor may be configured to modify the first imaging instruction based on the overlap region to produce a modified first imaging instruction. The processor may be configured to send the modified first imaging instruction to the first display so that the first image is output on the first display at the first resolution at a first time. The processor may be configured to send the second imaging instruction to the second display so that the second image is output on the second display at the second resolution at a second time. The first time may be substantially equal to the second time.

According to further examples, systems effective to output a composite image that includes a first image and a second image are generally described. The systems may include a first display, a second display, a memory, and a processor. The first display may include a first imaging property and a first resolution. The second display may include a second imaging property and a second resolution. The second imaging property may be different from the first imaging property. The memory may include instructions. The processor may be configured to be in communication with the memory, the first display and the second display. The processor may be configured to receive first display data that relates to the first image to be output on the first display. The processor may be configured to receive second display data that relates to the second image to be output on a second display. The processor may be configured to identify an overlap region where the first display overlaps the second display. The processor may be configured to generate a first imaging instruction effective to cause the first image to be output on the first display based on the first display data. The processor may be configured to generate a second imaging instruction effective to cause the second image to be output on the second display based on the second display data. The processor may be configured to modify the first imaging instruction based on the overlap region to produce a modified first imaging instruction. The processor may be configured to send the modified first imaging instruction to the first display so that the first image is output on the first display at the first resolution at a first time. The processor may be configured to send the second imaging instruction to the second display so that the second image is output on the second display at the second resolution at a second time. The first time may be substantially equal to the second time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 5 illustrates a computer program product for implementing a composite display with multiple imaging properties; and FIG. 6 is a block diagram illustrating an example computing device that is arranged to implement a composite display with multiple imaging properties, all arranged in accordance with at least some embodiments presented herein.

DETAILED DESCRIPTION

Figure 1:
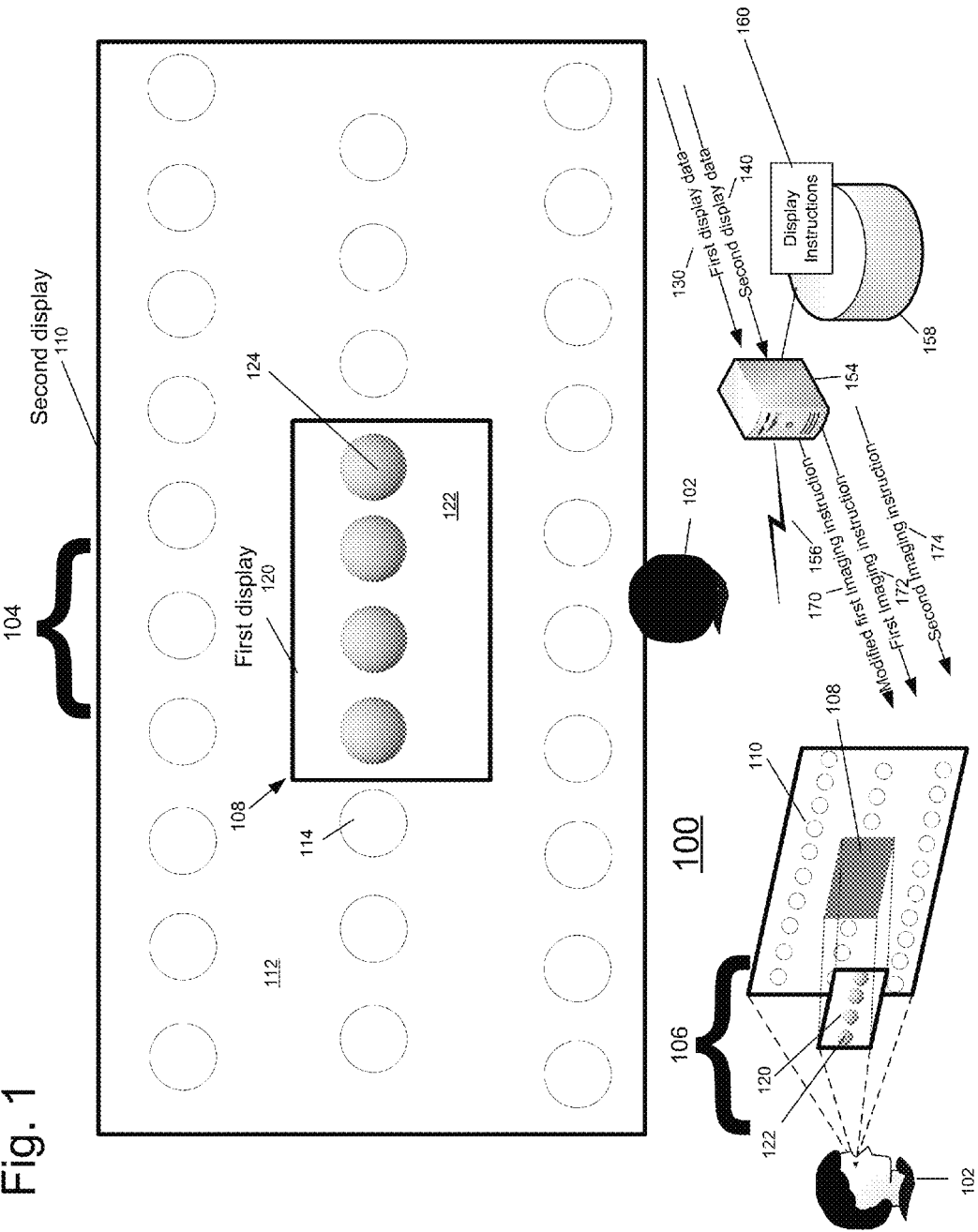
FIG. 1 illustrates an example system that can be utilized to implement a composite display with multiple imaging properties.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to technologies including methods, apparatus, systems, devices, and computer program products related to a composite display with multiple imaging properties.

Briefly stated, technologies are generally described for systems and methods effective to output a composite image. A processor may be configured to receive first and second display data that relate to a first and second image. The processor may identify an overlap region where the first display overlaps the second display and generate imaging instructions effective to cause the first and second image to be output on the first display and second display, respectively. The processor may further modify the first imaging instructions based on the overlap region to produce a modified first imaging instruction. The processor may send the modified first imaging instruction to the first display so that the first image is output on the first display at a first resolution. The processor may send the second imaging instruction to the second display so that the second image is output on the second display at a second resolution.

FIG. 1 illustrates an example system 100 that can be utilized to implement a composite display with multiple imaging properties, arranged in accordance with at least some embodiments presented herein. As depicted, FIG. 1 includes a front view 104 and a side perspective 106 of system 100. System 100 may include a first display 120 and a second display 110. First display 120 and second display 110 may be arranged to be in communication with a processor 154 through a communication link 156. In some examples, processor 154 may be adapted to be in communication with a memory 158 that may include display instructions 160 stored therein. Processor 154 may be configured, such as by display instructions 160, to control at least some of the operations/actions/functions described below. In one example, first display 120 may be an IPAD or other high resolution device or monitor. Second display 110 may be a television with a lower resolution than first display 120. First display 120 and processor 154 may be the same device and may be in the same housing. Second display 110 may be physically larger than first display 120. Front view 104 depicts a composite image, including images 112 and 122, viewed by a viewer 102.

First display 120 and second display 110 may have different imaging properties. For example, first display 120 may have a resolution that is higher than a resolution of second display 110. Resolution may be, for example, pixels per degree of a sight of viewer 102. In another example, resolution may be pixels per inch—such as in examples where both first and second displays 120 and 110 are flat Imaging properties of first display 120 and second display 110 may have other differences. For example, one of the displays may have three dimensional capabilities, better colors or a better refresh rate. In the example depicted in FIG. 1, first display 120 and second display 110 may be positioned in planes that are substantially parallel to each other. Viewer 102 may be able to view first display 120 and second display 110 at the same time. As explained in more detail below, first and second displays may provide enhanced viewing capabilities.

In one example, second display 110 may output images with a higher resolution than images output by first display 120. For example, second display 110 may output a relatively lower resolution image 112 with, for example, a lower resolution object 114. First display 120 may output a relatively higher resolution image 122 with, for example, a higher resolution object 124. First display 120 may overlap second display 110 at an overlap region 108. A portion of second display 110 may be obscured by first display 120 in overlap region 108. Image 122 may be smaller than image 112.

Image 112 on second display 110 may be complementary to image 122 on first display 120. For example, image 112 may show additional details relating to an object in image 122. In another example, image 122 output by first display 120 may be magnified or may be a more detailed representation of image 112. Image 122 may be a three dimensional representation of image 112 or a portion of image 112. Images 112 and 122 may be comprised of multiple frames.

Processor 154 may be configured to receive first display data 130 relating to image 122 and generate first imaging instruction 172. First display data 130 may include multiple frames and a timestamp attached to each frame. Processor 154 may be configured to receive second display data 140 relating to image 112 and generate second imaging instruction 174. Second display data 140 may have multiple frames and a timestamp attached to each frame. Display instructions 160 may include data relating to temporally synchronizing first display data 130 and second display data 140. First and second display data 130, 140 may be received from one or more sources. In one example, processor 154 may analyze a first timestamp from a frame in first display data 130 with a second timestamp from a frame from second display data 140. Processor 154 may then match the first and second timestamps and generate imaging instructions 172, 174. The matching may ensure that frames in first display data 130 are synchronized with complimentary frames in second display data 140. Processor 154 may identify overlap region 108 and modify first imaging instruction 172 based on overlap region 108 to produce modified first imaging instruction 170. Processor 154 may, such as by executing display instruction 160, send modified first imaging instruction 170 and second imaging instruction 174 to first and second displays 110 and 120.

Modified first imaging instruction 170 may include a frame from first display data 130 synchronized to a frame from second display data 140. In response to modified first imaging instruction 170, first display 120 may output an image from first display data 130. In response to second imaging instruction 174, second display 110 may output a complimentary image from second display data 140 at the same or substantially the same time. Processor 154 may synchronize a frame of first display data 130 with a corresponding frame from second display data 140 by matching timestamps from first and second display data 130, 140.

First display 120 may enhance a viewer experience by outputting image 122 in a higher resolution than second display 110. In another example, first display 120 may have some other desirable imaging property such as three dimensional capabilities, better colors or a better refresh rate. Second display 110 may enhance a viewer experience by displaying a lower resolution image 112 on a larger display than first display 120.

Among other possible benefits, a composite display with multiple imaging properties in accordance with the present disclosure may enhance a viewer's experience. Higher resolution, three dimensional capabilities, better colors or a better refresh rate from a first display may be combined with a larger range of vision from the second display. A system in accordance with the present disclosure can be utilized to extend the field of view of the first display with the second display where the second display adds periphery images and details to the image on the first display. In another embodiment, the second display can show an original image with the first display focusing in on a small portion of the image.

A system in accordance with the present disclosure may be used to enhance videoconferencing communications. A videoconference may be displayed on a larger second display while detailed documents such as drawings or images may be displayed on a smaller first display in a higher resolution.

Figure 2:
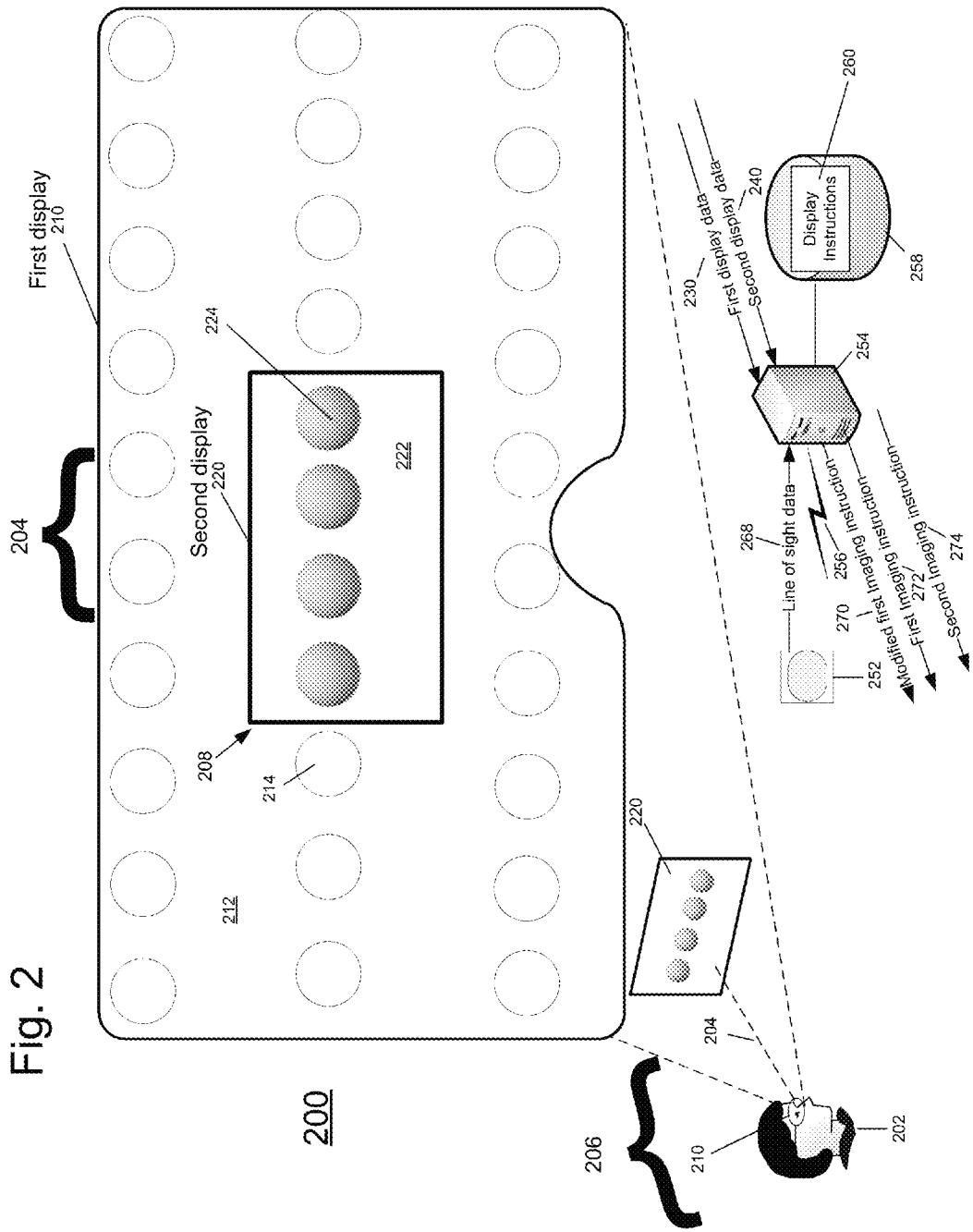
FIG. 2 illustrates another example system that can be utilized to implement a composite display with multiple imaging properties.

FIG. 2 illustrates an example system 200 that can be utilized to implement a composite display with multiple imaging properties, arranged in accordance with at least some embodiments presented herein. FIG. 2 includes a front view 204 and a side perspective 206 of system 200. System 200 may include a first display 210 and a second display 220. First display 210 and second display 220 may be arranged to be in communication with a processor 254 through a communication link 256. In some examples, processor 254 may be adapted to be in communication with a memory 258 that may include display instructions 260 stored therein. Processor 254 may be configured, such as by display instructions 260, to control at least some of the operations/actions/functions described below.

As shown in the example of FIG. 2, first display 210 may be an augmented reality ("AR") glasses device, such as GOGGLE GLASS. Side perspective 206 depicts a viewer 202 wearing an AR glasses device (corresponding to first display 210) and viewing second display 220 along a line of sight 204. Second display 220 may output image 222 including objects 224. First display 210 may output image 212 including objects 214. Image 222, including objects 224 may be complementary to image 212. Front view 204 illustrates a composite image, including images 212 and 222, viewed by viewer 202. Second display 220 may be physically larger than first display 210. Image 212 may appear larger to viewer 202 than image 222 because image 212 may appear in a larger field of view. First display 210 may overlap second display 220 at an overlap region 208.

Processor 254 may be adapted to be in communication with an eye tracking and movement sensor 252. Eye tracking and movement sensor 252 may track the location and movement of viewer 202 and eyes of viewer 202. Eye tracking and movement sensor 252 may determine line of sight data 268 relating to line of sight 204.

Processor 254 may be configured to receive first display data 230 relating to image 222 and generate first imaging instruction 272. First display data 230 may include multiple frames and a timestamp attached to each frame. Processor 254 may be configured to receive second display data 240 relating to image 212 and generate second imaging instruction 274. Second display data 240 may have multiple frames and a timestamp attached to each frame. Display instructions 260 may include data relating to temporally synchronizing first display data 230 and second display data 240. First and second display data 230, 240 may be received from one or more sources. In one example, processor 254 may analyze a first timestamp from a frame in first display data 230 with a second timestamp from a frame from second display data 240. Processor 254 may then match the first and second timestamps and generate imaging instructions 272, 274. The matching may ensure that frames in first display data 230 are synchronized with complimentary frames in second display data 240. Processor 254 may identify overlap region 208 and modify first imaging instruction 272 based on overlap region 208 to produce modified first imaging instruction 270. Processor 254 may, such as by executing display instructions 260, send modified first imaging instruction 270 and second imaging instruction 274 to first and second displays 210 and 220.

Processor 254 may receive line of sight data 268. Processor 154 may determine line of sight 204 from line of sight data 268 and identify overlap region 208 where first display 210 overlaps second display 220 based on line of sight 204. Processor 254 may, such as by executing display instructions 260, determine data in second display data 240 relating to overlap region 208. In one example, processor 254 may modify first imaging instruction 272 based on data in second display data 240 relating to overlap region 208 to produce modified first imaging instruction 270. For example, processor 254 may modify first imaging instruction 272 by erasing data that relates to overlap region 208 so that no images are output by first display 210 in overlap region 208.

Modified first imaging instruction 270 may include a frame from first display data 230 synchronized to a frame from second display data 240. In response to modified first imaging instruction 270, first display 210 may output an image from first display data 230. In response to second imaging instruction 274, second display 220 may output a complimentary image from second display data 240 at the same or substantially the same time.

In one example, viewer 202 could use an AR glasses device (corresponding to the first display) to enhance an image being viewed on a second display such as a flat screen television. The AR glasses device may provide additional periphery images and details to enhance the image on the second display. A second viewer in the same room may not be wearing an AR glasses device. The second viewer could still view the image on the second display but may not have the enhanced experience of viewing the images displayed on AR glasses device.

Figure 3:
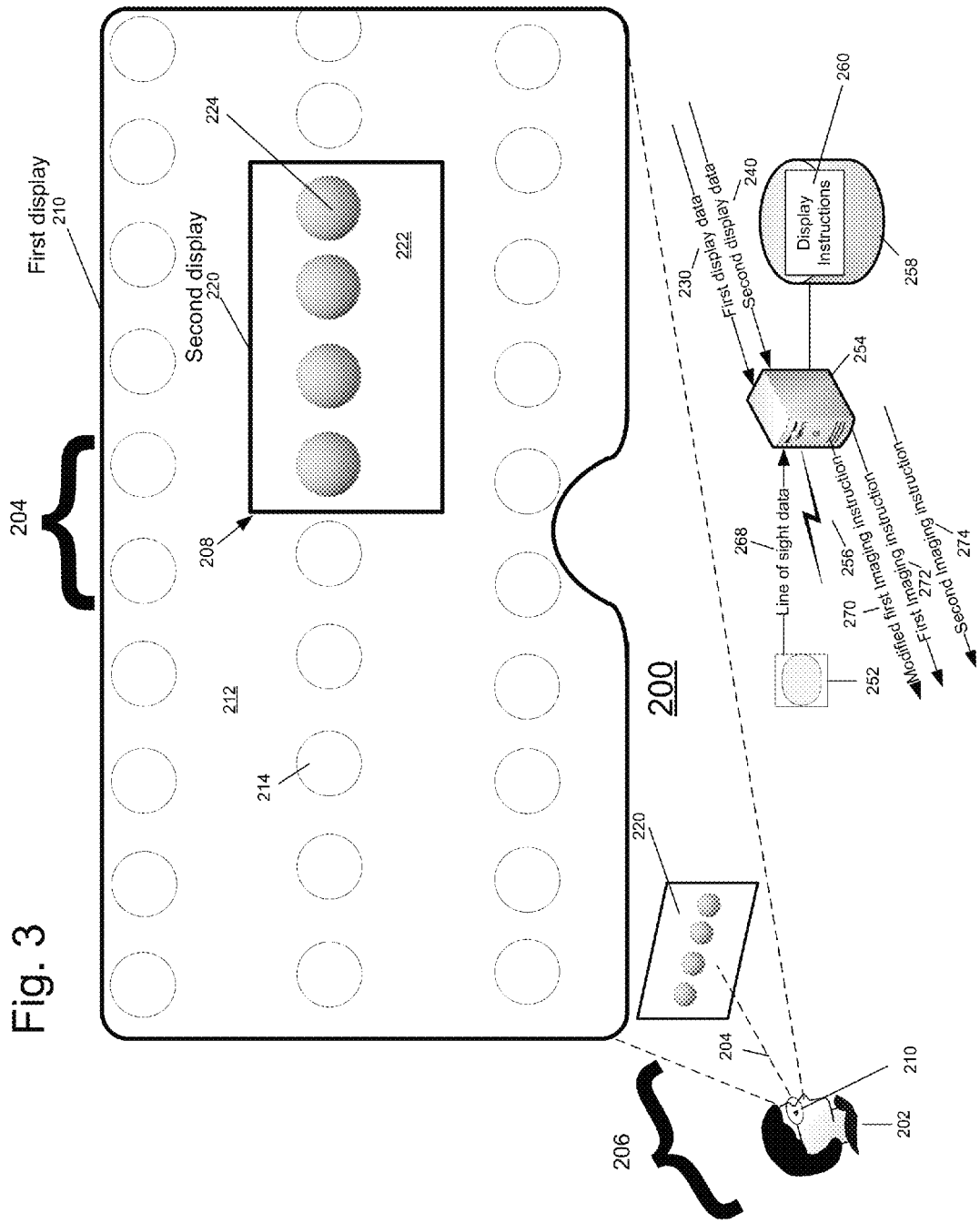
FIG. 3 illustrates the example system of FIG. 2 with further details relating to a change of a line of sight.

FIG. 3 illustrates an example system 200 of FIG. 2 with further details relating to a line of sight change, arranged in accordance with at least some embodiments presented herein. System 200 depicted in FIG. 3 is substantially similar to system 200 of FIG. 2, with additional details. Those components in FIG. 3 that are labeled identically to components of FIG. 2 will not be described again for the purposes of clarity.

In the depicted example, system 200 may include viewer 202 wearing AR glass device (corresponding to first display 210) and viewing second display 220. Second display 220 may be stationary, while first display may not. As shown, overlap region 208 may change when viewer 202 moves or the eyes of viewer 202 moves. Processor 254 may, by receiving line of sight data 268, identify changes to line of sight 204 and overlap region 208 in response to the movement by viewer 202 or eyes of viewer 202. Processor 254 may produce modified first imaging instruction 270 by erasing data in first display data 230 that relates to overlap region 208.

In one example, a first viewer could use an AR glasses device to enhance an image being viewed on a first display such as a flat screen television. The AR glasses device may provide additional periphery images and details to enhance the image on the first display. A second viewer in the same room may also be wearing an AR glasses device. The second viewer may be at a different location within the room than the first viewer and at a different proximity to the first display. The AR glasses device worn by the second viewer may provide additional periphery images and details to enhance the image on the first display to the second viewer. The periphery images and details provided by the AR glasses device to the second viewer may be different than the periphery images and details provided to the first user due to the different location within the room and different proximity to the first display.

In another example, the second display may be a three dimensional display and the first display may be an AR glasses device. A viewer wearing AR glasses device may a direct line of sight to a particular portion of image—for example, an object. A processor may use line of sight data to follow the eye movements of user and determine the line of sight. Processor may produce first modified imaging instruction such that the second display may enhance object. The second display may output an object larger or in a higher resolution than before processing by the processor. A viewer may zoom in on a particular area of an image being displayed by a high resolution television. The television may focus on the particular area while the AR glasses device may output other peripheral details. The television could output a three dimensional image while the AR glasses device may output higher resolution.

Among other possible benefits, a system in accordance with the present disclosure may be used to enhance home entertainment, providing relatively high resolution images along with a larger field of view. In one example, systems may be used for flight simulations by providing both detailed high resolution images and additional periphery images.

Among other possible benefits, many viewers may view a first display while wearing AR glasses devices. Each viewer may have a slightly different view of the first display and would view different images details provided by respective second displays—the AR glasses devices. Viewers of the first display without an AR glasses device would still experience the images from the first device. An example may be patrons at a sports bar with a large screen television. Patrons with an AR glasses device may enhance their experience by viewing additional images or details on the AR glasses device. Multiple patrons wearing AR glasses devices may be able to view the same television and share the enhanced experience.

In another example, a system in accordance with the present disclosure may provide customers on a plane with enhanced in-flight entertainment. The first display may be a movie screen or a seat display device within the plane. AR glasses devices may be provided or brought by a customer to enhance the viewing experience by providing additional images and details in the periphery of the first display.

Figure 4:
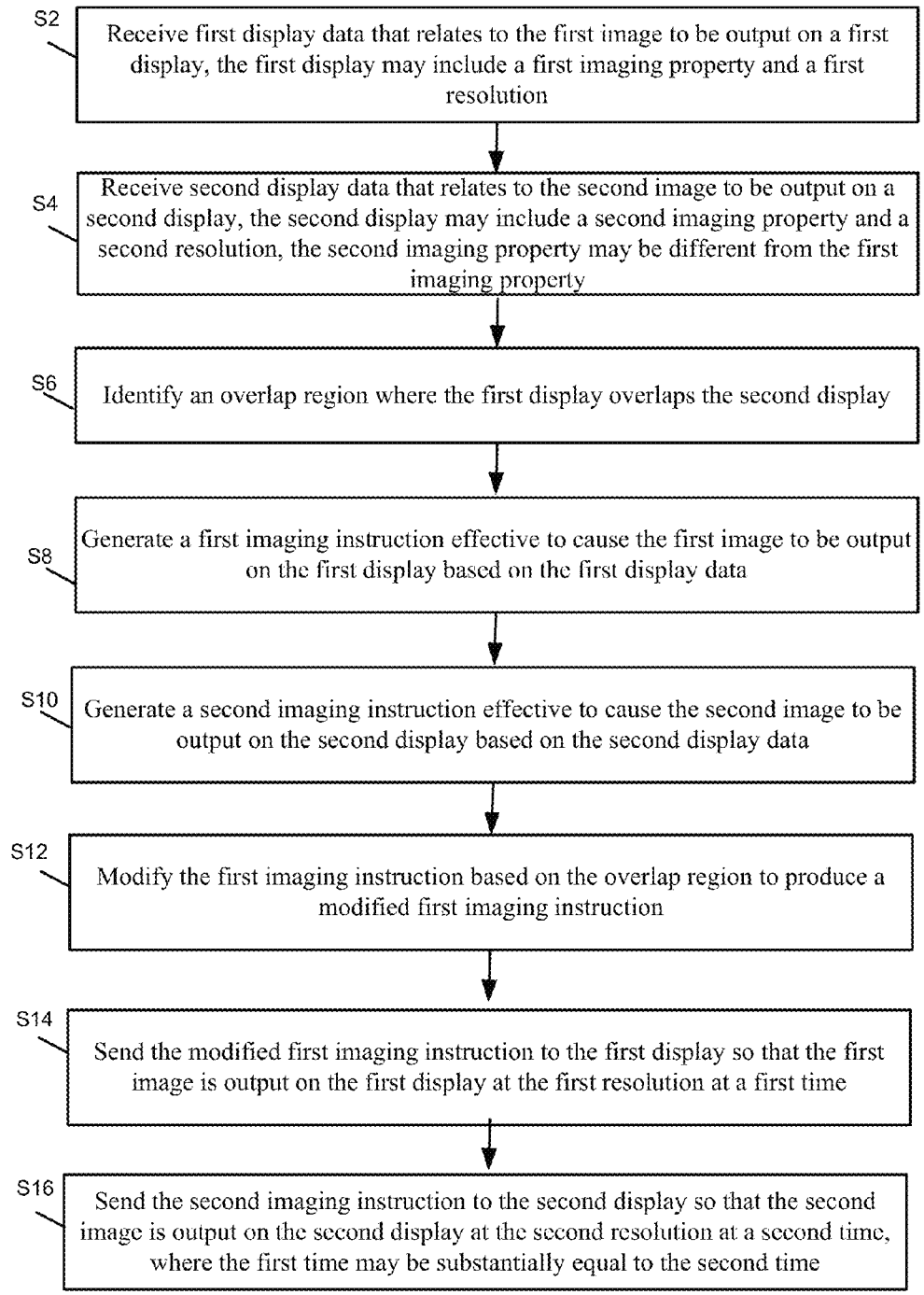
FIG. 4 illustrates a flow diagram of an example process for implementing a composite display with multiple imaging properties.

FIG. 4 illustrates a flow diagram of an example process to implement a composite display with multiple imaging properties arranged in accordance with at least some embodiments presented herein. The process in FIG. 4 could be implemented using, for example, systems 100 or 200 discussed above and may be used to output a composite image that includes a first image and a second image. An example process may include one or more operations, actions, or functions as illustrated by one or more of blocks S2, S4, S6, S8, S10, S12, S14 and/or S16. Although illustrated as discrete blocks, various blocks may be divided into additional blocks, combined into fewer blocks, or eliminated, depending on the desired implementation.

Processing may begin at block S2 "Receive first display data that relates to the first image to be output on a first display, the first display may include a first imaging property and a first resolution." At block S2, the processor may receive first display data that relates to the first image.

Processing may continue from block S2 to block S4 "Receive second display data that relates to the second image to be output on a second display, the second display may include a second imaging property and a second resolution, the second imaging property may be different from the first imaging property." At block S4, the processor may receive second display data that relates to the second image. In some examples, the second display may be physically larger than the first display and the second image may be larger than the first image. In some examples, the first display may obscure a portion of the second display.

In some examples, the second display may be physically larger than the first display and the first image may be larger than the second image. In some examples, the display properties may relate to resolutions. In some examples, the second imaging property may relate to generation of a three dimensional image. In some examples, the first and second display data may be from the same source. In other examples, the first and second display data may be from different sources.

Processing may continue from block S4 to block S6 "Identify an overlap region where the first display overlaps the second display." At block S6, the processor may identify an overlap region. In some examples, the processor may determine line of sight data and identification of the overlap region may be based on the line of sight data.

Processing may continue from block S6 to block S8 "Generate a first imaging instruction effective to cause the first image to be output on the first display based on the first display data" At block S8, the processor may generate a first imaging instruction. In some examples, generating the first imaging instruction may include analyzing a first time stamp of a frame in the first display data, analyzing a second time stamp of a frame in the second display data, and matching the first time stamp with the second time stamp Processing may continue from block S8 to block S10 "Generate a second imaging instruction effective to cause the second image to be output on the second display based on the second display data." At block S10, the processor may generate a second imaging instruction.

Processing may continue from block S10 to block S12 "Modify the first imaging instruction based on the overlap region to produce a modified first imaging instruction." At block S12, the processor may modify the first imaging instruction.

Processing may continue from block S12 to block S14 "Send the modified first imaging instruction to the first display so that the first image is output on the first display at the first resolution at a first time" At block S14, the processor may send the modified first imaging instruction to the first display. In some examples, modifying the first imaging instruction may include erasing data that relates to the overlap region.

Processing may continue from block S14 to block S16 "Send the second imaging instruction to the second display so that the second image is output on the second display at the second resolution at a second time, where the first time may be substantially equal to the second time" At block S16, the processor may send the second imaging instruction to the second display.

FIG. 5 illustrates computer program products 500 a composite display with multiple imaging properties arranged in accordance with at least some embodiments presented herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to systems 100 or 200, processor 154 or 254 may undertake one or more of the blocks shown in FIG. 5 in response to instructions 504 conveyed to the systems 100 or 200 by signal bearing medium 502.

In some implementations, signal bearing medium 502 may encompass a computer-readable medium 506, such as, but not limited to, a hard disk drive (HDD), a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communication link, a wireless communication link, etc.). Thus, for example, computer program product 500 may be conveyed to one or more modules of the systems 100 or 200 by an RF signal bearing medium 502, where the signal bearing medium 502 is conveyed by a wireless communications medium 510 (e.g., a wireless communications medium conforming with the IEEE 802.11 standard).

FIG. 6 is a block diagram illustrating an example computing device 600 that is arranged to implement a composite display with multiple imaging properties arranged in accordance with at least some embodiments presented herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP core), or any combination thereof An example memory controller 618 may also be used with processor 604, or in some implementations, memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof System memory 606 may include an operating system 620, one or more applications 622, and program data 624.

Application 622 may include an imaging property algorithm 626 that is arranged to perform the functions as described herein including those described previously with respect to FIGS. 1-5. Program data 624 may include imaging property data 628 that may be useful for a composite display with multiple imaging properties as is described herein. In some embodiments, application 622 may be arranged to operate with program data 624 on operating system 620 such that a composite display with multiple imaging properties may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to output a composite image that includes a first image and a second image, the method comprising:
   receiving, by a processor, first display data that relates to the first image to be output on a first display of a first device, wherein the first display includes a first imaging property and a first resolution;
   receiving, by the processor, second display data that relates to the second image to be output on a second display of a second device, wherein the second display is located in a different plane spaced from the first display, wherein the second display includes a second imaging property and a second resolution, and wherein the second imaging property is different from the first imaging property;
   identifying, by the processor, an overlap region where the first display overlaps the second display;
   generating, by the processor, a first imaging instruction effective to cause the first image to be output on the first display based on the first display data;
   generating, by the processor, a second imaging instruction effective to cause the second image to be output on the second display based on the second display data;
   modifying, by the processor, the first imaging instruction based on the overlap region to produce a modified first imaging instruction, wherein modifying the first imaging instruction includes erasing data that relates to the overlap region;
   sending, by the processor, the modified first imaging instruction to the first display so that the first image is output on the first display at the first resolution at a first time; and
   sending, by the processor, the second imaging instruction to the second display so that the second image is output on the second display at the second resolution at a second time, wherein the first time is substantially equal to the second time.

2. The method of claim 1, wherein:
   the second display is physically larger than the first display, and
   the second image is larger than the first image.

3. The method of claim 2, wherein the first display obscures a portion of the second display.

4. The method of claim 1, wherein:
   the second display is physically larger than the first display, and
   the first image is larger than the second image.

5. The method of claim 1, further comprising:
   determining, by the processor, line of sight data, wherein the overlap region is identified based on the line of sight data.

6. The method of claim 1, wherein:
   the first imaging property relates to the first resolution, and
   the second imaging property relates to the second resolution.

7. The method of claim 1, wherein the second imaging property relates to generation of a three dimensional image.

8. The method of claim 1, wherein the first display data and the second display data are from a same source.

9. The method of claim 1, wherein the first display data and the second display data are from different sources.

10. The method of claim 1, wherein the first image is complimentary to the second image.

11. The method of claim 1, wherein generating the first imaging instruction comprises:
    analyzing a first time stamp of a frame in the first display data;
    analyzing a second time stamp of a frame in the second display data; and
    matching the first time stamp with the second time stamp.

12. A first device effective to output a composite image that includes a first image and a second image, the first device comprising:
    a memory that includes instructions; and
    a processor configured to be in communication with the memory, wherein the processor is further configured to execute the instructions to:
      receive first display data that relates to the first image to be output on a first display of a second device, wherein the first display includes a first imaging property and a first resolution;
      receive second display data that relates to the second image to be output on a second display of a third device, wherein the second display is located in a different plane spaced from the first display, wherein the second display includes a second imaging property and a second resolution, and wherein the second imaging property is different from the first imaging property;
      identify an overlap region where the first display overlaps the second display;
      generate a first imaging instruction effective to cause the first image to be output on the first display based on the first display data;
      generate a second imaging instruction effective to cause the second image to be output on the second display based on the second display data;
      modify the first imaging instruction based on the overlap region to produce a modified first imaging instruction, wherein the modification of the first imaging instruction includes erasure of data that relates to the overlap region;
      send the modified first imaging instruction to the first display so that the first image is output on the first display at the first resolution at a first time; and
      send the second imaging instruction to the second display so that the second image is output on the second display at the second resolution at a second time, wherein the first time is substantially equal to the second time.

13. The first device of claim 12, wherein:
    the second display is physically larger than the first display,
    the second image is larger than the first image, and
    the first display obscures a portion of the second display.

14. The first device of claim 12, wherein:
    the second display is physically larger than the first display,
    the first image is larger than the second image,
    the processor is further effective to determine line of sight data, and
    the identification of the overlap region is based on the line of sight data.

15. A system effective to output a composite image that includes a first image and a second image, the system comprising:
- a first display of a first device, wherein the first display includes a first imaging property and a first resolution;
- a second display of a second device, wherein the second display includes a second imaging property and a second resolution, wherein the second display is located in a different plane spaced from the first display, and wherein the second imaging property is different from the first imaging property;
- a memory that includes instructions; and
- a processor configured to be in communication with the memory, the first display, and the second display, wherein the processor is further configured to execute the instructions to:
    - receive first display data that relates to the first image to be output on the first display;
    - receive second display data that relates to the second image to be output on the second display;
    - identify an overlap region where the first display overlaps the second display;
    - generate a first imaging instruction effective to cause the first image to be output on the first display based on the first display data;
    - generate a second imaging instruction effective to cause the second image to be output on the second display based on the second display data;
    - modify the first imaging instruction based on the overlap region to produce a modified first imaging instruction, wherein the modification of the first imaging instruction includes erasure of data that relates to the overlap region;
    - send the modified first imaging instruction to the first display so that the first image is output on the first display at the first resolution at a first time; and
    - send the second imaging instruction to the second display so that the second image is output on the second display at the second resolution at a second time, wherein the first time is substantially equal to the second time.

16. The system of claim 15, wherein the first display and the second display are positioned in planes that are substantially parallel to each other.

17. The system of claim 15, further comprising:
- a third display of a third device, wherein the third display includes a third imaging property and a third resolution, wherein the third display is located in a different plane from the first display and the second display, wherein the third imaging property is different from the first imaging property and the second imaging property, wherein the overlap region is a first overlap region, and wherein the processor is further configured to execute the instructions to:
    - receive third display data that relates to a third image to be output on the third display;
    - identify a second overlap region where the third display overlaps the second display;
    - generate a third imaging instruction effective to cause the third image to be output on the third display based on the third display data;
    - modify the third imaging instruction based on the second overlap region to produce a modified third imaging instruction, wherein the modified third imaging instruction is different from the modified first imaging instruction; and
    - send the modified third imaging instruction to the third display so that the third image is output on the third display at the third resolution at the first time.

18. The system of claim 15, wherein the first display and the processor are in a same housing.